(12) United States Patent
Edman et al.

(10) Patent No.: US 8,246,093 B2
(45) Date of Patent: Aug. 21, 2012

(54) BLADE HANDLING APPARATUS

(75) Inventors: Frederick C. Edman, Mesa, AZ (US);
Gary E. Jones, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 331 days.

(21) Appl. No.: 12/633,973

(22) Filed: Dec. 9, 2009

(65) Prior Publication Data

US 2011/0135435 A1     Jun. 9, 2011

(51) Int. Cl.
*B66C 1/66* (2006.01)
(52) U.S. Cl. ............... 294/86.4; 294/103.1; 414/741
(58) Field of Classification Search ............. 294/86.4, 294/103.1, 119.1, 158, 67.31; 414/728, 732, 414/738, 741
See application file for complete search history.

(56) References Cited

U.S. PATENT DOCUMENTS

| | | | | |
|---|---|---|---|---|
| 3,954,188 A * | 5/1976 | Boyle | .......................... | 414/735 |
| 4,032,184 A * | 6/1977 | Blair | .............................. | 294/207 |
| 4,042,122 A * | 8/1977 | Espy et al. | ..................... | 414/728 |
| 4,383,788 A * | 5/1983 | Sylvander | .................. | 414/792.9 |
| 4,500,065 A * | 2/1985 | Hennekes et al. | ............ | 248/542 |
| 5,178,506 A * | 1/1993 | Meschi | ......................... | 414/268 |
| 6,082,797 A * | 7/2000 | Antonette | .................. | 294/103.1 |

* cited by examiner

*Primary Examiner* — Dean Kramer
(74) *Attorney, Agent, or Firm* — Parsons Behle & Latimer (57) ABSTRACT

A blade handling apparatus includes a mount frame; a stinger boom carried by the mount frame; and a lift block assembly including a lift block carried by the stinger boom; a pair of rod housings carried by the lift block; a pair of push rods slidably carried by the pair of rod housings, respectively; and a pair of blade lock pins carried by the pair of rod housings, respectively, and engaged by the pair of push rods, respectively.

23 Claims, 6 Drawing Sheets

BLADE HANDLING APPARATUS

TECHNICAL FIELD

The disclosure relates to apparatus for handling heavy objects. More particularly, the disclosure relates to an ergonomic blade handling apparatus which is suitable to facilitate the safe movement of helicopter main rotor blades into and out of storage containers, racks and carts.

BACKGROUND

Conventionally, Apache main rotor blades may be manually removed from storage containers and stored in a rack prior to installation of the blades in pre-flight operations. However, lifting of the blades from the storage container may be laborious to personnel and may also risk damage to the blades in the event that the blades are inadvertently dropped. Overhead cranes may be used in some blade-handling operations but these operations may not be amenable to portability and may require more than one person to implement.

Therefore, an ergonomic blade handling apparatus which is suitable to facilitate the safe movement of helicopter main rotor blades into and out of storage containers, racks and carts is needed.

SUMMARY

The disclosure is generally directed to a blade handling apparatus. An illustrative embodiment of the apparatus includes a mount frame; a stinger boom carried by the mount frame; and a lift block assembly including a lift block carried by the stinger boom; a pair of rod housings carried by the lift block; a pair of push rods slidably carried by the pair of rod housings, respectively; and a pair of blade lock pins carried by the pair of rod housings, respectively, and engaged by the pair of push rods, respectively, and sliding plate with ramp features to bias rollers that displace push rods that displace blade lock pins.

In some embodiments, the apparatus may include a mount frame; a stinger boom carried by the mount frame; and a lift block assembly including a lift block slidably carried by the stinger boom which also allows for full rotation of the lift block for blade re-orientations; a blade lock plate having a pair of roller grooves carried by the lift block; a pair of rod housings carried by the lift block; a pair of push rods slidably carried by the pair of rod housings, respectively; a pair of rod springs biasing the pair of push rods against the rollers, respectively, toward the blade lock plate; and a pair of springs biasing a pair of blade lock pins carried by the pair of rod housings against the push rods, respectively, and engaged by the pair of push rods, respectively.

In some embodiments, the blade handling apparatus may include a mount frame; a stinger boom carried by the mount frame; and a lift block assembly including a lift block slidably carried by the stinger boom; a blade lock plate having a pair of roller grooves carried by the lift block; a pair of rod housings carried by the lift block; a pair of push rods slidably carried by the pair of rod housings and attached to rollers, respectively; a pair of rod springs biasing the pair of roller and push rod assemblies, respectively, toward the blade lock plate; and a pair of blade lock pins carried by the pair of rod housings, respectively, and a pair of springs biasing the blade lock pins against a pair of push rods, respectively, and engaged by the pair of push rods, respectively. The rod springs are adapted to bias the pair of push rods in a first position against the pair of roller grooves, respectively, in the blade lock plate and the pair of push rods disengage the pair of lock pins and the pair of lock pins are retracted into the pair of rod housings, respectively. The blade lock plate is adapted to bias the pair of push rods in a second position wherein the push rods disengage the pair of roller grooves, respectively, and engage and extend the pair of lock pins from the pair of rod housings, respectively.

In some embodiments, the blade handling apparatus may include a mount frame; first and second pairs of glide bearings carried by the mount frame; a first slide arm carried by the first pair of glide bearings; a second slide arm carried by the second pair of glide bearings; a stinger boom carried by and disposed for lateral movement along the first slide arm; a linear actuator carried by the mount frame and engaging the stinger boom; and a lift block assembly. The lift block assembly may include a lift block slidably carried by the stinger boom; a blade lock plate having a pair of roller grooves carried by the lift block; a pair of rod housings carried by the lift block; a pair of push rods slidably carried by the pair of rod housings, respectively; a pair of rod springs biasing the pair of push rods, respectively, toward the blade lock plate; and a pair of blade lock pins carried by the pair of rod housings, respectively, and engaged by the pair of push rods, respectively. The rod springs are adapted to bias the pair of push rods in a first position against the pair of roller grooves, respectively, in the blade lock plate and the pair of push rods disengage the pair of lock pins and the pair of lock pins are retracted into the pair of rod housings, respectively. The blade lock plate is adapted to bias the pair of push rods in a second position wherein the push rods disengage the pair of roller grooves, respectively, and engage and extend the pair of lock pins from the pair of rod housings, respectively. A linear actuator cylinder may be carried by and disposed for lateral movement along the second slide arm. A linear actuator piston may be extendable from the linear actuator cylinder and engaging the stinger boom. A linear actuator may be carried by the linear actuator cylinder and engage the linear actuator piston.

The disclosure is further generally directed to a method of handling a rotor blade. An illustrative embodiment of the method includes providing a handling apparatus comprising a mount frame, a stinger boom carried by the mount frame, a lift block assembly including a lift block carried by the stinger boom and at least one lock pin carried by the lift block; providing a rotor blade; attaching the rotor blade to the lift block by causing engagement of the at least one lock pin with the rotor blade; and positioning the rotor blade by movement of the lift block.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
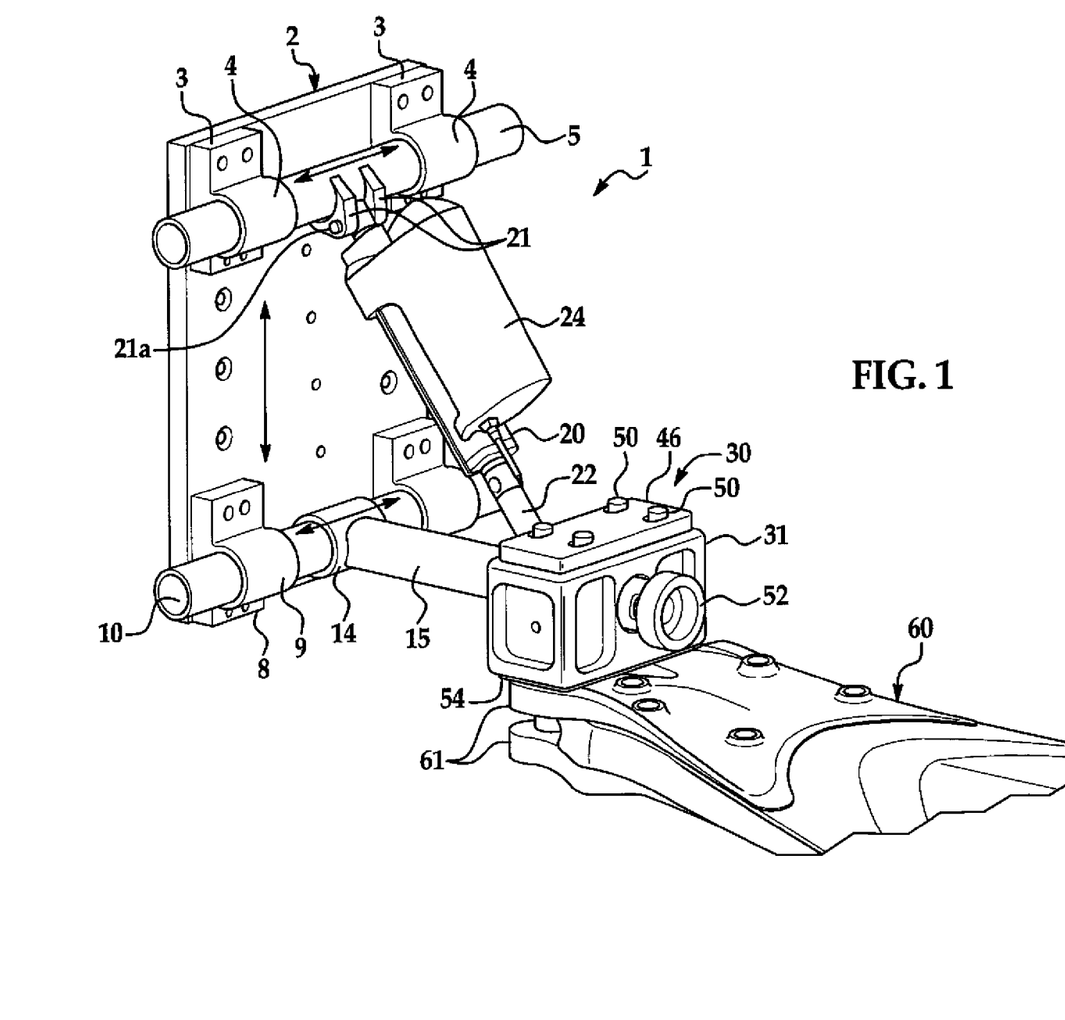
FIG. 1 is a perspective view of an illustrative embodiment of the blade handling apparatus, with a main rotor blade (in section) attached to the apparatus.

Referring to the drawings, an illustrative embodiment of the blade handling apparatus, hereinafter apparatus, is generally indicated by reference numeral 1 in FIG. 1. As will be hereinafter described, the apparatus 1 may be suitable for handling a helicopter main rotor blade such as during operations in which the blade 60 is removed from a storage container (not shown) preparatory to installation of the blade 60 in pre-flight operations. The ergonomic design of the apparatus 1 may reduce the manpower required for such operations and may reduce the likelihood that the blade 60 is inadvertently dropped and damaged during handling. While particularly suitable for handling helicopter main rotor blades 60, it will become apparent that the apparatus 1 is amenable to handling other types of objects.

The apparatus 1 may include a mount frame 2 which in some embodiments may be attached to or may be a component of a material lifting apparatus such as a ground-driven lifting vehicle or an ALUM-A-LIFT (trademark) material lifting apparatus, for example and without limitation, model number C1500CSLRPD-60. The mount frame 2 may be adapted to facilitate vertical movement of the blade handling apparatus 1 for purposes which will be hereinafter described.

A generally horizontal upper slide arm 5 and a generally horizontal lower slide arm 10 may be mounted for horizontal movement with respect to the mount frame 2 according to the knowledge of those skilled in the art. In some embodiments, the upper slide arm 5 may be attached to the mount frame 2 using a pair of spaced-apart upper glide bearings 4 which receive the upper slide arm 5. In like manner, the lower slide arm 10 may be attached to the mount frame 2 using a pair of spaced-apart lower glide bearings 9 which receive the lower slide arm 10. The upper glide bearings 4 may be attached to the mount frame 2 using a pair of upper mount blocks 3, respectively. The lower glide bearings 9 may be attached to the mount frame 2 using a pair of lower mount blocks 8, respectively. In other embodiments, the upper slide arm 5 and the lower slide arm 10 may be attached to the mount frame 2 using alternative attachment techniques known to those skilled in the art.

Figure 3:
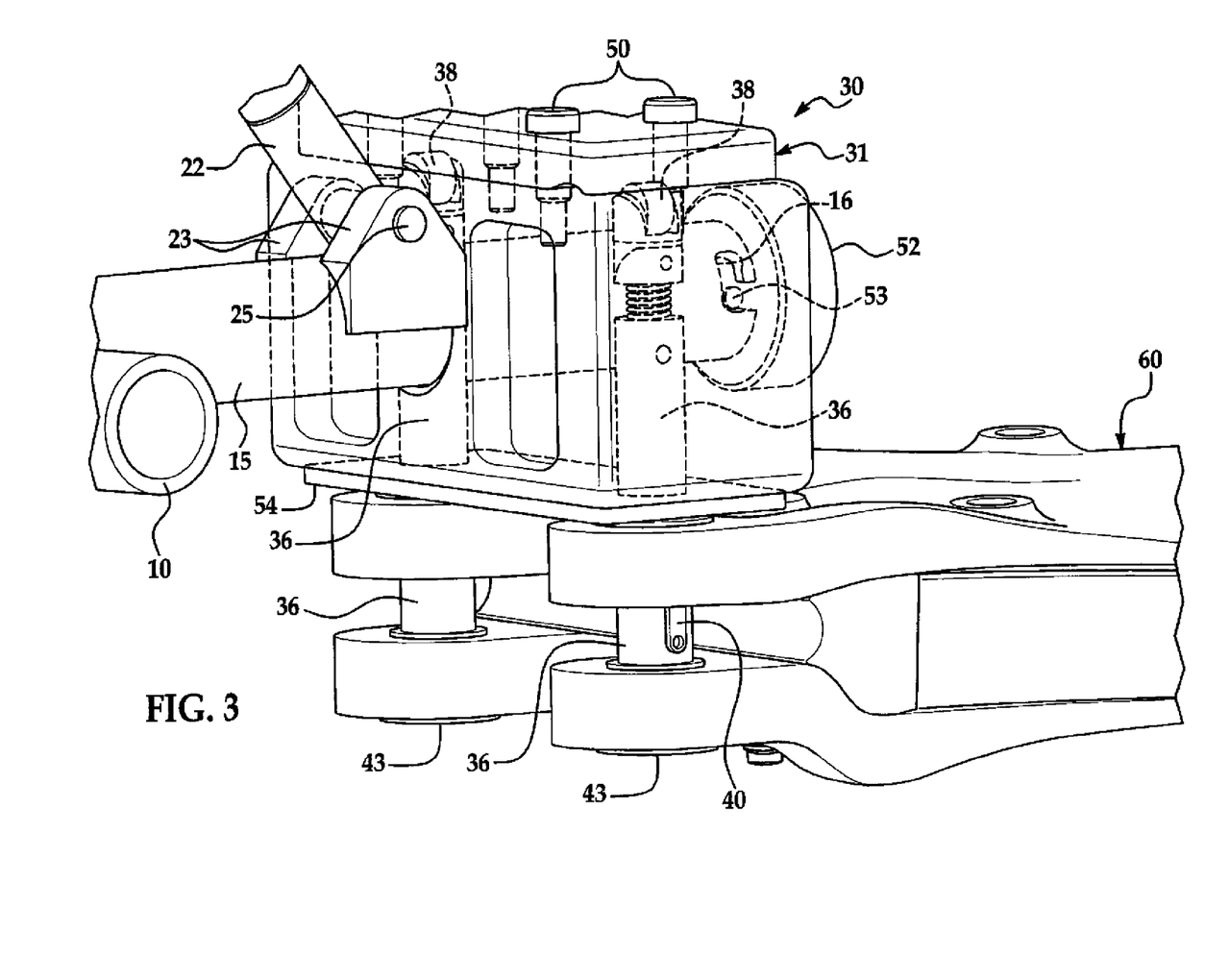
FIG. 3 is a rear perspective view of the lift block assembly (shown in phantom), with a stinger boom inserted through the lift block assembly.

A generally elongated stinger boom 15 may extend from the lower slide arm 10. The stinger boom 15 may be attached to the lower slide arm 10 according to the knowledge of those skilled in the art. In some embodiments, a stinger boom twist to release collar 14 may terminate the proximal end of the stinger boom 15. The stinger boom collar 14 may receive the lower slide arm 10. In other embodiments, the stinger boom 15 may be attached to the lower slide arm 14 using brackets (not shown), welding (not shown) and/or other suitable attachment techniques known by those skilled in the art. As shown in FIG. 3, an L-shaped pin slot 16 may be provided in the distal end of the stinger boom 15 for ¼ turn twist to release and removal of distal end of stinger boom release collar.

Figure 2:
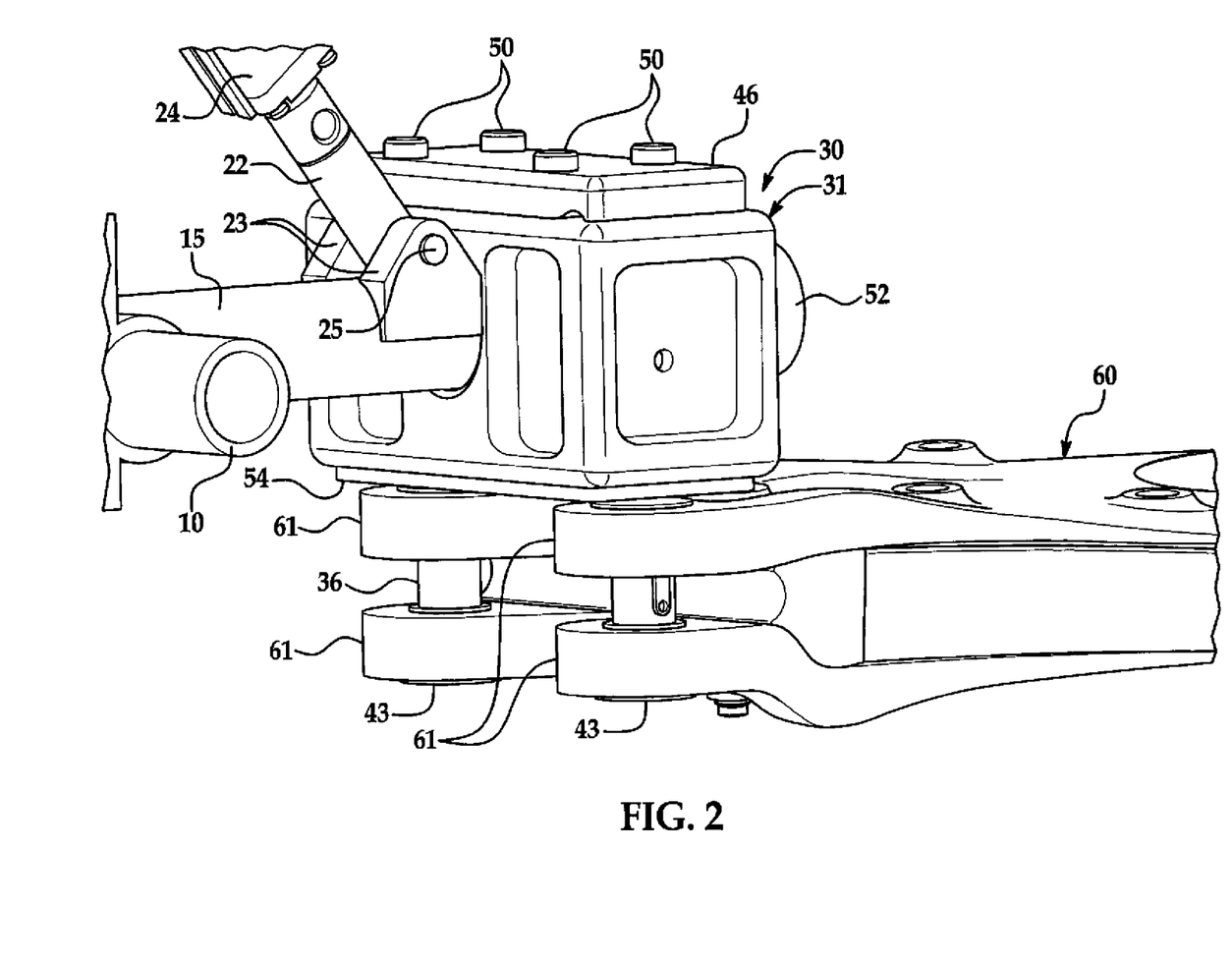
FIG. 2 is a rear perspective view of a lift block assembly of an illustrative embodiment of the blade handling apparatus, more particularly detailing an exemplary technique for attaching blade root fittings of the main rotor blade to the lift block assembly.

A linear actuator cylinder 20 may extend from the upper slide arm 5. The proximal end of the linear actuator cylinder 20 may be pivotally attached to the upper slide arm 5 according to any suitable technique known to those skilled in the art. As shown in FIG. 1, in some embodiments a pair of spaced-apart cylinder brackets 21 may be provided on the upper slide arm 5. The linear actuator cylinder 20 may be pivotally attached between the cylinder brackets 21 via a pivot pin 21a. A linear actuator piston may be telescopically extendable from the linear actuator cylinder 20. As shown in FIG. 2, the distal end of the linear actuator piston 22 may be pivotally attached to the stinger boom 15 according to the knowledge of those skilled in the art. In some embodiments, a pair of spaced-apart piston brackets 23 may be provided on the stinger boom 15. The linear actuator piston 22 may be pivotally mounted between the piston brackets 23 via a pivot pin 25. A linear actuator 24 may be provided on the linear actuator cylinder 20. The linear actuator 24 may engage the linear actuator piston 22 such that the linear actuator piston 22 is selectively extended from and retracted into the linear actuator cylinder 20 responsive to operation of the linear actuator 24. Accordingly, the linear actuator 24 may facilitate vertical pivoting of the stinger boom 15 with respect to the mount frame 2 for purposes which will be hereinafter described.

Figure 4:
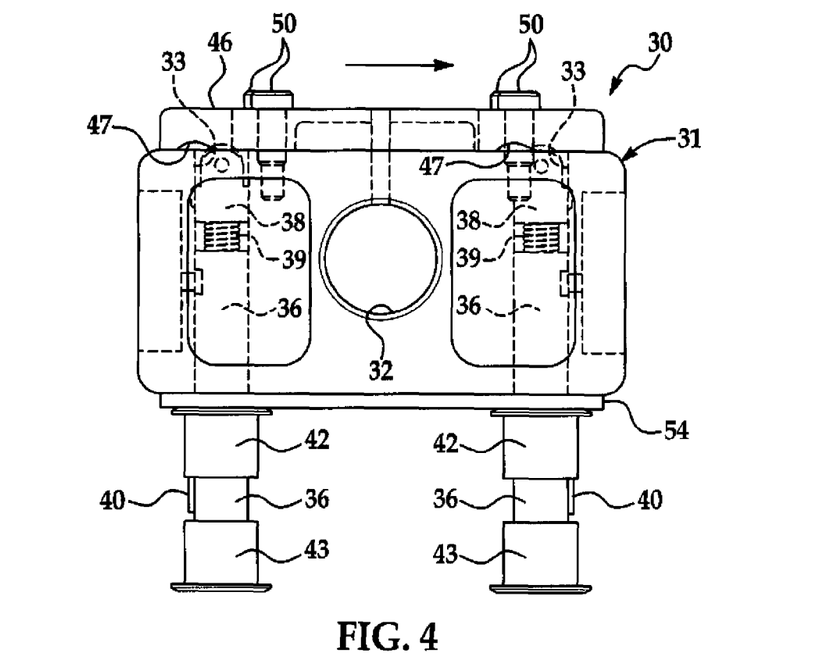
FIG. 4 is a front view of the lift block assembly, with the interior components of the assembly illustrated and the blade lock pins of the lift block assembly shown in a blade locking configuration.
Figure 5:
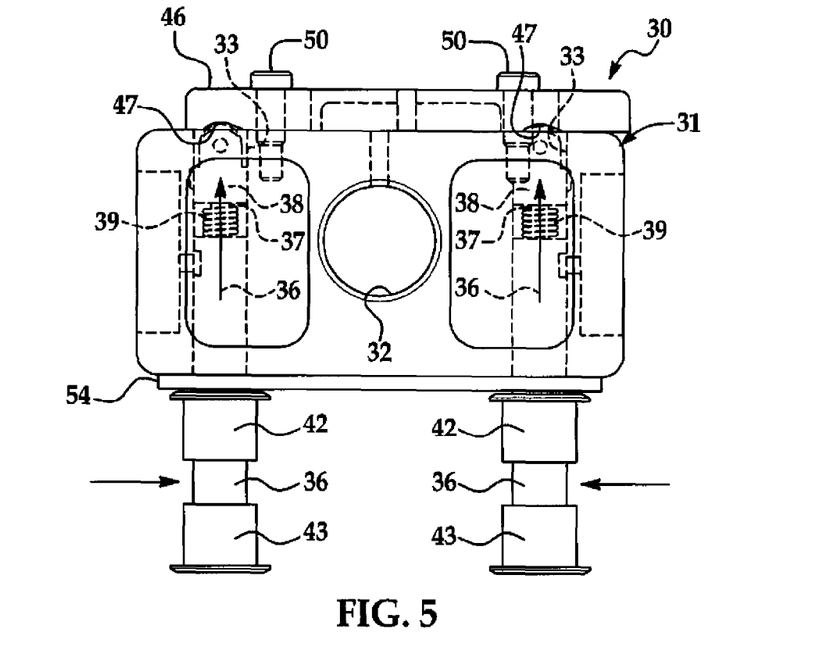
FIG. 5 is a front view of the lift block assembly, with the interior components of the assembly illustrated and the blade lock pins of the lift block assembly shown in a blade unlocking configuration.
Figure 5A:
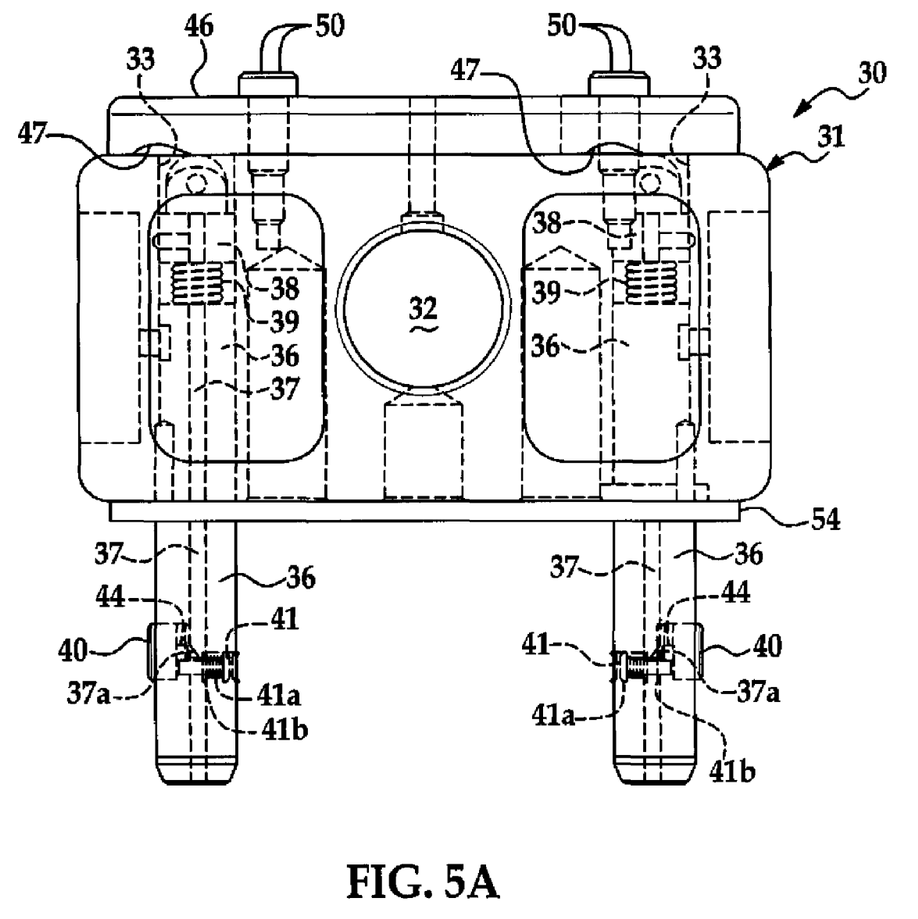
FIG. 5A is a front view of the lift block assembly, with the interior components of the assembly illustrated and the blade lock pins of the lift block assembly shown in a blade locking configuration, more particularly detailing an exemplary mechanism for extending and retracting the blade lock pins of the lift block assembly.

A lift block assembly 30 may be provided on the stinger boom 15. The lift block assembly 30 may include a lift block 31 which is mounted on the stinger boom 15 according to the knowledge of those skilled in the art. In some embodiments, the lift block 31 may be mounted for 360-degree rotation on the stinger boom 15. As shown in FIGS. 4 and 5, in some embodiments a stinger boom opening 32 may extend through the lift block 31 of the lift block assembly 30. As shown in FIG. 3, the stinger boom 15 may extend through the stinger boom opening 32. A lock cap 52 may be provided on the distal end of the stinger boom 15 to secure the lift block 31 on the stinger boom 15. A lock pin 53 may extend from the lock cap 52. The lock pin 53 may be adapted for insertion into the L-shaped pin slot 16 which is provided in the distal end of the stinger boom 15 to secure the lock cap 52 on the stinger boom 15 and lock the lift block 31 on the stinger boom 15.

As further shown in FIGS. 4 and 5, a pair of spaced-apart rod openings 33 may extend through the lift block 31 of the lift block assembly 30 on respective sides of the stinger boom opening 32. The rod openings 33 may be disposed in a generally vertical orientation in the lift block 31. A generally elongated rod housing 36 may be provided in each rod opening 33. A spring-loaded push rod 37 (FIG. 5) may be slidably mounted and adapted for vertical movement in each rod housing 36. A roller 38 may terminate the upper end of each push rod 37. In some embodiments, each roller 38 may be attached to the upper end of each push rod 37 through an interference fit. A coiled rod spring 39 may normally bias each push rod 37 upwardly in the corresponding rod housing 36.

A blade lock pin 40 may be extendable from a pin slot (not shown) which is provided in a lower end portion of each rod housing 36 outside the lift block 31. A pin screw 41 may be threaded into a pin barb 41b which is provided on the blade lock pin 40. A pin spring 41a may normally bias the pin screw 41 such that the pin screw 41 and the pin barb 41b pull the blade lock pin 40 against the push rod 37 and maintain the blade lock pin 40 in a retracted position with respect to the pin slot. The lower end 37a of each push rod 37 may be ramped or beveled such that when it is disposed in the lower position in the rod housing 36 against the bias exerted by the rod spring 39, as shown in FIG. 4, each spring-loaded push rod 37 may force the corresponding blade lock pin 40 outwardly from the pin slot in the corresponding rod housing 36 in a blade-locking position against the retaining bias imparted against the blade lock pin 40 via the pin screw 41, the pin spring 41a and the pin barb 41b. A dowel pin 44 may be interposed between the beveled lower end 37a of the push rod 37 and the blade lock pin 40. Conversely, when the rod spring 39 biases the push rod 37 in the upper position in the rod housing 36, as shown in FIG. 5, each spring-loaded push rod 37 may release pressure from the corresponding blade lock pin 40 through the dowel pin 44 such that the pin spring 41a, via the pin screw 41 and the pin barb 41b, pulls and retracts the blade lock pin 40 into the corresponding pin slot provided in the rod housing 36 in a blade-unlocking position.

A manually slidable blade lock plate 46 may be provided on the lift block 31 to facilitate selective locking of the push rods 37 in the blade-locking position or the blade-unlocking position. Accordingly, plate bolts 50 may extend through respective plate slots (not shown) provided in the blade lock plate 46 and into registering underlying bolt openings (not shown) provided in the lift block 31. A pair of concave roller grooves 47 may be provided in the blade lock plate 46. As shown in FIG. 4, when the blade lock plate 46 is in the left position shown in FIG. 4, the roller grooves 47 are offset with respect to the respective rollers 38 and therefore, the blade lock plate 46 pushes the push rods 37 downwardly into the lower blade-locking position in the rod housings 36 against the bias imparted by the rod springs 39. Conversely, as shown in FIG. 5, when the blade lock plate 46 is shifted to the right position as indicated by the arrow in FIG. 4, the roller grooves 47 register with the respective rollers 38. Therefore, the rod springs 39 push the push rods 37 upwardly into the upper blade-unlocking position in the rod housings 36 until the rollers 38 extend into the respective roller grooves 47.

A spacer plate 54 may be provided on the rod housings 36 at the lower surface of the lift block 31. A pair of upper blade collars 42 may be provided on the respective rod housings 36 and against or adjacent to the spacer plate 54. A pair of lower blade collars 43 may be provided on the respective rod housings 36 in spaced-apart relationship with respect to the respective upper blade collars 42. Each lower blade collar 43 may be friction-secured on the corresponding rod housing 36 according to the knowledge of those skilled in the art. Each blade lock pin 40 may be disposed between the upper blade collar 42 and the lower blade collar 43 on each corresponding rod housing 36.

In an exemplary application, the apparatus 1 is used to lift and position a helicopter main rotor blade 60 as the blade 60 is removed from a storage container (not shown) and placed in a rack (not shown) for storage prior to installation in pre-flight operations. Accordingly, vertical adjustment of the lift block assembly 30 may be facilitated by movement of the mount frame 2 through operation of the material lifting apparatus (not shown) to which the mount frame 2 is attached or of which the mount frame 2 is a part. Tilting or angular adjustment of the lift block assembly 30 may be facilitated by extension and retraction of the linear actuator piston 22 with respect to the linear actuator cylinder 20 via the linear actuator 24. This action facilitates vertical pivoting of the stinger boom 15 as the lower slide arm 10 rotates in the lower glide bearings 9.

The blade lock plate 46 of the lift block assembly 30 is initially disposed in the right-hand blade-unlocking position shown in FIG. 5 such that the rollers 38 snap into the respective roller grooves 47 in the blade lock plate 46 and the blade lock pins 40 (FIG. 4) are retracted into the pin slots (not shown) in the rod housings 36. With the lower blade collars 43 (FIG. 4) removed from the respective rod housings 36 of the lift block assembly 30, the rod housings 36 are inserted into the respective openings (not shown) which are provided in the blade root fittings 61 of the main rotor blade 60. The blade lock plate 46 is then shifted to the left on the lift block 31 such that the rollers 38 disengage the respective roller grooves 47 in the blade lock plate 46 and the blade lock plate 46 pushes the respective push rods 37 (FIG. 5) downwardly in the rod housings 36 against the bias imparted by the rod springs 39. This action causes the ramped or angled lower ends (not shown) of the push rods 37 to apply outward pressure against the blade lock pins 40, which are forced outwardly from the respective pin slots (not shown) provided in the rod housings 36. The blade lock pins 40 insert into pin openings (not shown) which are provided in the blade root fittings 61 to lock the blade 60 onto the lift block assembly 30. The lower blade collars 43 may be replaced on the lower ends of the respective rod housings 36.

The apparatus 1 may be operated to first lift the main rotor blade 60 from the storage container (not shown) and then lower the main rotor blade 60 onto a rack or other support surface (not shown). Vertical movement of the lift block assembly 30 and main rotor blade 60 may be accomplished by vertical operation of the mount frame 2 and the linear actuator 24. The lift block assembly 30 can be moved laterally by sliding of the upper slide arm 5 through the upper glide bearings 4 and sliding of the lower slide arm 10 through the lower glide bearings 9. The main rotor blade 60 can be tilted using the linear actuator 24 and/or rotated by rotating the lift block 31 on the stinger boom 15, as needed, to facilitate placement of the main rotor blade 60 on an uneven surface (not shown).

After the main rotor blade 60 has been placed on the rack or other support surface, the main rotor blade 60 may be detached from the lift block assembly 30 by removing the lower blade collars 43 from the respective rod housings and shifting the blade lock plate 46 from the left position (FIG. 4) to the right position (FIG. 5) as indicated by the arrow in FIG. 4. Accordingly, the rod springs 39 bias the push rods 37 upwardly in the respective rod housings 36 until the rollers 38 snap into the respective roller grooves 47 provided in the blade lock plate 46 and the push rods 37 disengage the blade lock pins 40. Therefore, the blade lock pins 40 retract into the pin slots (not shown) provided in the respective rod housings and disengage the blade root fittings 61 of the main rotor blade 60, facilitating release of the blade root fittings 61 from the lift block assembly 30. The lift block assembly 30 may then be returned to the original position at the storage container to repeat the process with another main rotor blade 60.

In some applications, modifications may be made to the lift block assembly 30 according to the knowledge of those skilled in the art to facilitate mounting of the lift block assembly 30 on the end of forks on a fork lift (not shown). This facility would enable rotation of the main rotor blade 60 for inspection of the bottom surface of the blade 60 after shipping and handling, for example.

Figure 6:
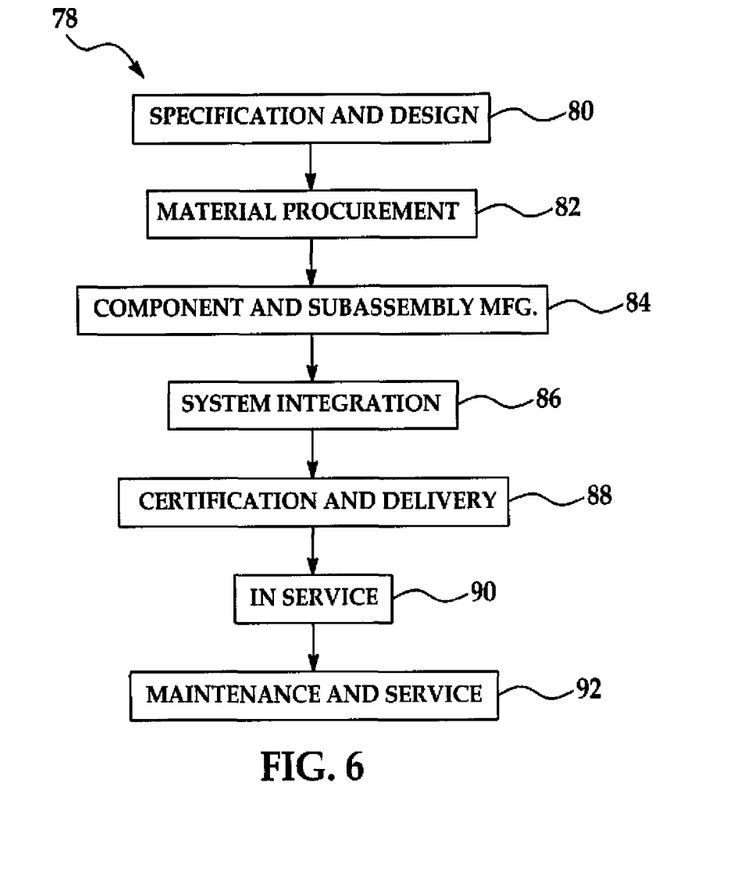
FIG. 6 is a flow diagram of an aircraft production and service methodology.
Figure 7:
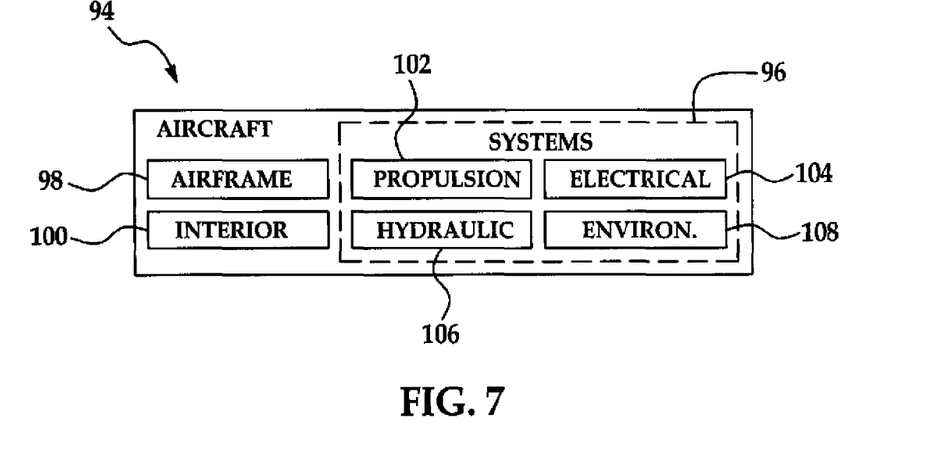
FIG. 7 is a block diagram of an aircraft.

Referring next to FIGS. 6 and 7, embodiments of the disclosure may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A handling apparatus, comprising:
a mount frame;
a stinger boom carried by said mount frame; and
a lift block assembly including:
a lift block carried by said stinger boom;
at least one lock pin carried by said lift block;
at least one rod housing carried by said lift block; and
at least one push rod slidably carried by said at least one rod housing, respectively, and engaging said at least one lock pin.

2. The apparatus of claim 1 further comprising a linear actuator carried by said mount frame and engaging said stinger boom.

3. The apparatus of claim 2 further comprising first and second slide arms carried by said mount frame and wherein said stinger boom is carried by said first slide arm and said linear actuator is carried by said second slide arm.

4. The apparatus of claim 2 further comprising a linear actuator cylinder carried by said mount frame and a linear actuator piston extendable from said linear actuator cylinder and engaging said stinger boom, and wherein said linear actuator engages said linear actuator piston.

5. The apparatus of claim 1 further comprising at least one blade collar carried by said at least one rod housing.

6. A handling apparatus, comprising:
a mount frame;
a stinger boom carried by said mount frame;
a lift block assembly including:
a lift block carried by said stinger boom;
at least one lock pin carried by said lift block; and
a stinger boom opening provided in said lift block, said stinger boom extending through said stinger boom opening; and
a lock cap detachably engaging said stinger boom.

7. A handling apparatus, comprising:
a mount frame;
a stinger boom carried by said mount frame;
a lift block assembly including:
a lift block carried by said stinger boom; and
at least one lock pin carried by said lift block;
a linear actuator carried by said mount frame and engaging said stinger boom; and
first and second slide arms carried by said mount frame, said stinger boom being carried by said first slide arm and said linear actuator being carried by said second slide arm.

8. The apparatus of claim 7 further comprising first and second pairs of glide bearings carried by said mount frame and wherein said first slide arm is slidably carried by said first pair of glide bearings and said second slide arm is slidably carried by said second pair of glide bearings.

9. A handling apparatus, comprising:
a mount frame;
a stinger boom carried by said mount frame;
a lift block assembly including:
a lift block carried by said stinger boom; and
at least one lock pin carried by said lift block;
a linear actuator carried by said mount frame and engaging said stinger boom;
a linear actuator cylinder carried by said mount frame; and
a linear actuator piston extendable from said linear actuator cylinder and engaging said stinger boom, said linear actuator engaging said linear actuator piston.

10. A blade handling apparatus, comprising:
a mount frame;
a stinger boom carried by said mount frame; and
a lift block assembly including:
a lift block slidably carried by said stinger boom;
a blade lock plate having a pair of roller grooves carried by said lift block;
at least one rod housing carried by said lift block;
at least one push rod slidably carried by said at least one rod housing, respectively;
at least one rod spring biasing said at least one push rod, respectively, toward said blade lock plate;
at least one blade lock pin carried by said at least one rod housing, respectively, and engaged by said at least one push rod, respectively; and
at least one spring biasing said at least one blade lock pin.

11. The apparatus of claim 10 further comprising a stinger boom opening provided in said lift block and wherein said stinger boom extends through said stinger boom opening.

12. The apparatus of claim 11 further comprising a lock cap detachably engaging said stinger boom.

13. The apparatus of claim 10 further comprising a linear actuator carried by said mount frame and engaging said stinger boom.

14. The apparatus of claim 13 further comprising first and second slide arms carried by said mount frame and wherein said stinger boom is carried by said first slide arm and said linear actuator is carried by said second slide arm.

15. The apparatus of claim 14 further comprising first and second pairs of glide bearings carried by said mount frame and wherein said first slide arm is slidably carried by said first pair of glide bearings and said second slide arm is slidably carried by said second pair of glide bearings.

16. The apparatus of claim 13 further comprising a linear actuator cylinder carried by said mount frame and a linear actuator piston extendable from said linear actuator cylinder and engaging said stinger boom, and wherein said linear actuator engages said linear actuator piston.

17. The apparatus of claim 10 further comprising at least one blade collar carried by said at least one rod housing.

18. A blade handling apparatus, comprising:
a mount frame;
a stinger boom carried by said mount frame; and
a lift block assembly including:
a lift block slidably carried by said stinger boom;
a blade lock plate having at least one roller groove carried by said lift block;
at least one rod housing carried by said lift block;
at least one push rod slidably carried by said at least one rod housing, respectively;
at least one rod spring biasing said at least one push rod, respectively, toward said blade lock plate;
at least one blade lock pin carried by said at least one rod housing, respectively, and engaged by said at least one push rod, respectively;
wherein said rod spring is adapted to bias said at least one push rod in a first position against said at least one roller groove, respectively, in said blade lock plate and said at least one push rod disengages said at least one lock pin and said at least one lock pin is retracted into said at least one rod housing, respectively; and
wherein said blade lock plate is adapted to bias said at least one push rod in a second position wherein said push rod disengages said at least one roller groove, respectively, and engages and extends said at least one lock pin from said at least one rod housing, respectively.

19. The apparatus of claim 18 further comprising a linear actuator carried by said mount frame and engaging said stinger boom.

20. The apparatus of claim 19 further comprising a linear actuator cylinder carried by said mount frame and a linear actuator piston extendable from said linear actuator cylinder and engaging said stinger boom, and wherein said linear actuator engages said linear actuator piston.

21. The apparatus of claim 18 further comprising a stinger boom opening provided in said lift block and wherein said stinger boom extends through said stinger boom opening, and further comprising a lock cap detachably engaging said stinger boom.

22. A blade handling apparatus, comprising:
a mount frame;
first and second pairs of glide bearings carried by said mount frame;
a first slide arm carried by said first pair of glide bearings;
a second slide arm carried by said second pair of glide bearings;
a stinger boom carried by and disposed for lateral movement along said first slide arm;
a linear actuator carried by said mount frame and engaging said stinger boom; and
a lift block assembly including:
a lift block slidably carried by said stinger boom;
a blade lock plate having a pair of roller grooves carried by said lift block;
a pair of rod housings carried by said lift block;
a pair of push rods slidably carried by said pair of rod housings, respectively;
a pair of rod springs biasing said pair of push rods, respectively, toward said blade lock plate;
a pair of blade lock pins carried by said pair of rod housings, respectively, and engaged by said pair of push rods, respectively;
wherein said rod springs are adapted to bias said pair of push rods in a first position against said pair of roller grooves, respectively, in said blade lock plate and said pair of push rods disengage said pair of lock pins and said pair of lock pins are retracted into said pair of rod housings, respectively; and
wherein said blade lock plate is adapted to bias said pair of push rods in a second position wherein said push rods disengage said pair of roller grooves, respectively, and engage and extend said pair of lock pins from said pair of rod housings, respectively;
a linear actuator cylinder carried by and disposed for lateral movement along said second slide arm;
a linear actuator piston extendable from said linear actuator cylinder and engaging said stinger boom; and
wherein said linear actuator cylinder engages said linear actuator piston.

23. A method of handling a rotor blade, comprising:
using a handling apparatus comprising:
a mount frame;
a stinger boom carried by said mount frame; and
a lift block assembly including:
a lift block carried by said stinger boom;
at least one lock pin carried by said lift block;
at least one rod housing carried by said lift block; and
at least one push rod slidably carried by said at least one rod housing, respectively, and engaging said at least one lock pin;
attaching a rotor blade to said lift block by causing engagement of said at least one lock pin with said rotor blade; and
positioning said rotor blade by movement of said lift block.

* * * * *